United States Patent [19]

Matsuki et al.

[11] Patent Number: 5,715,257
[45] Date of Patent: Feb. 3, 1998

[54] SYSTEM FOR RE-TRANSMISSION IN DATA COMMUNICATION

[75] Inventors: Hideo Matsuki; Hitoshi Takanashi, both of Kanagawa, Japan

[73] Assignee: Nippon Telegraph and Telephone Corporation, Tokyo, Japan

[21] Appl. No.: 541,870

[22] Filed: Oct. 10, 1995

[30] Foreign Application Priority Data

Oct. 11, 1994 [JP] Japan .................. 6-270176

[51] Int. Cl.⁶ .................................................... H04L 1/08
[52] U.S. Cl. .................................................... 371/32
[58] Field of Search .................................................. 371/32

[56] References Cited

U.S. PATENT DOCUMENTS 5,163,054 11/1992 Nagy ........................................ 371/32

FOREIGN PATENT DOCUMENTS

| 0 430 125 A1 | 6/1991 | European Pat. Off. . |
| 4-269031 | 9/1992 | Japan . |
| WO 93/20632 | 10/1993 | WIPO . |

OTHER PUBLICATIONS

"An Improved Selective–Repeat ARQ Strategy", Weldon, Jr., *IEEE Transactions on Communications*, vol. COM–30, No. 3, Mar. 1982, pp. 480–486.

"Improving Automatic Repeat–Request (ARQ) Performance on Satellite Channels Under High Error Rate Conditions", SASTRY, *IEEE Transactions on Communications*, vol. COM–23, No. 4, Apr. 1975, pp. 436–439.

*Primary Examiner*—Stephen M. Baker
*Attorney, Agent, or Firm*—Nikaido Marmelstein Murray & Oram LLP

[57] ABSTRACT

An SR (Selective Repeat) ARQ system with limited buffer memory is realized by modifying a part of a user data area. A transmitter side modifies a part of a user data area in a data frame so that it differs at least one bit from corresponding part of a frame with the same frame number as that of a current frame in a preceding modulo turn, and a receiver side compares said part of a user data area with corresponding part of a frame with the same frame number as that of a current frame in a preceding modulo turn. When they coincide, the receiver side disregards the received frame as it is re-transmitted frame which is already received correctly, and when they do not coincide, the receiver side takes the received frame. Preferably, said part of a user data area is the last word area in a user data area in a frame structure. When a user data has more words than capacity of a user data area in a frame structure, and when last word is completely equal to last word of a frame with the same frame number as that of a current frame in a preceding modulo turn, the last word in a user data area is transferred to a succeeding frame, and an area for that last word is filled with a data which differs at least one bit from a data in the last word in the corresponding frame having the same frame number as that of the current frame in a preceding modulo turn.

4 Claims, 12 Drawing Sheets

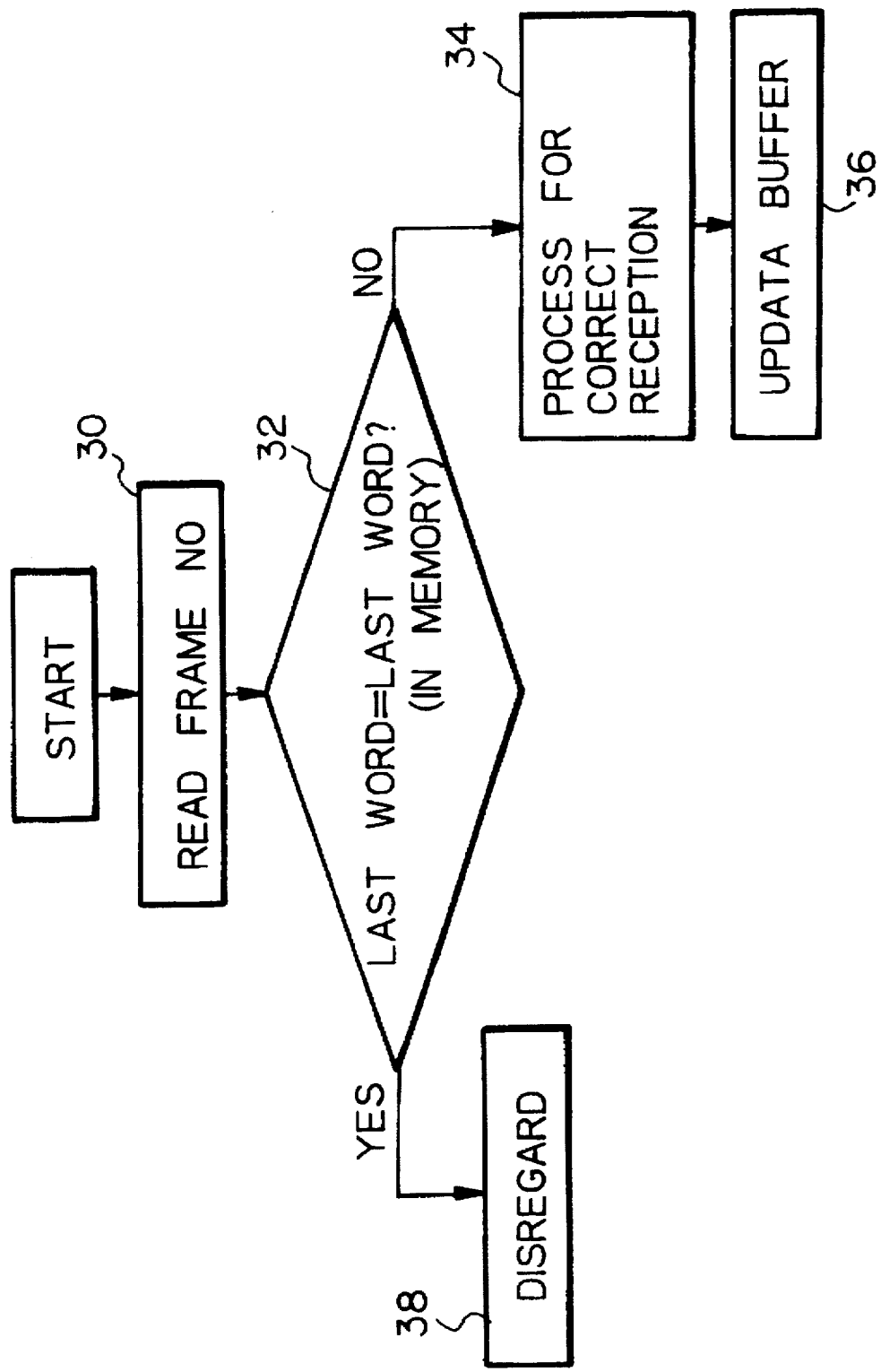

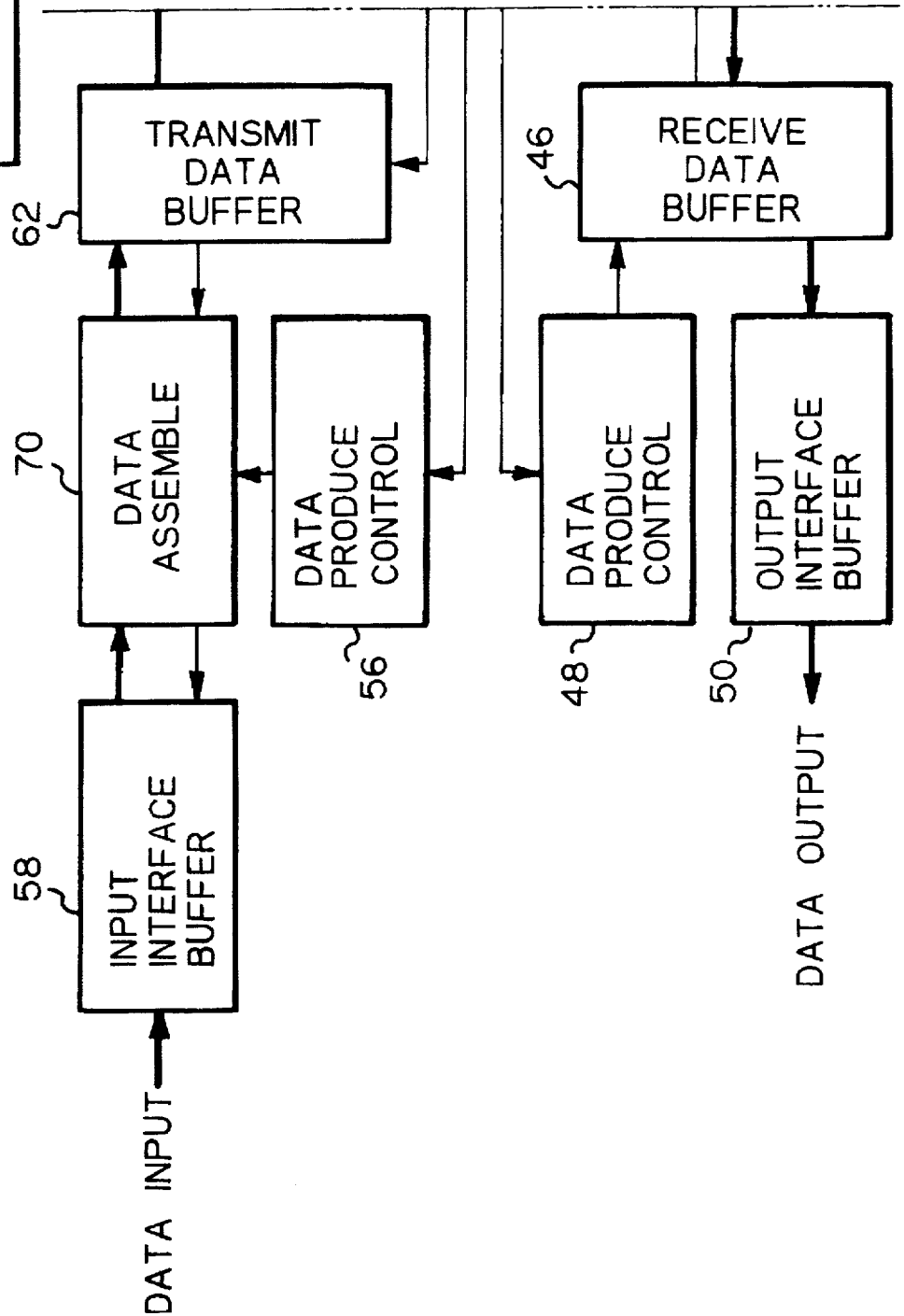

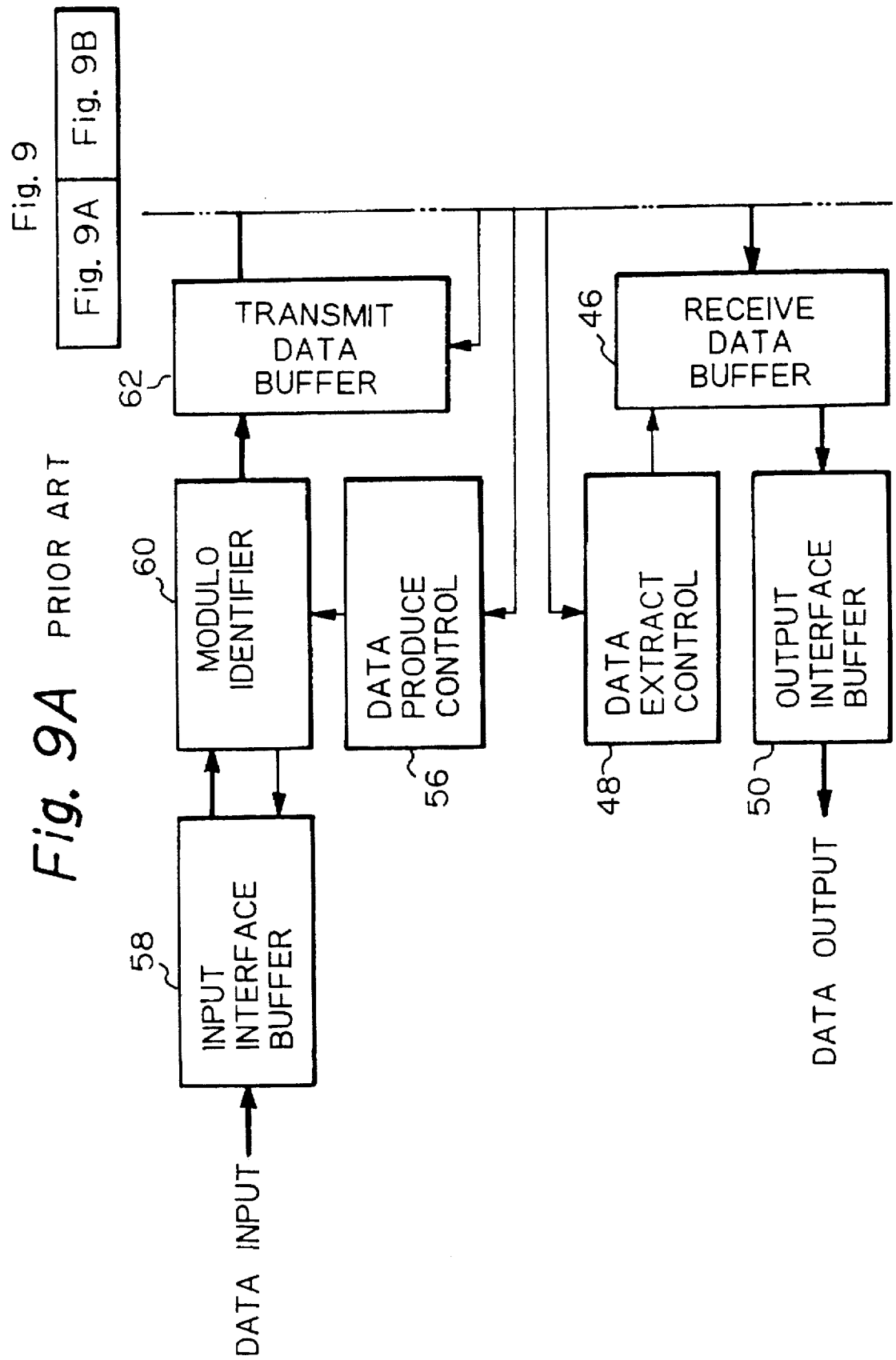

SYSTEM FOR RE-TRANSMISSION IN DATA COMMUNICATION

BACKGROUND OF THE INVENTION

The present invention relates to an ARQ system, or a system for automatic request (or repeat) transmission in data communication system, in particular, relates to such a system which provides error-free transmission with high efficiency in a mobile communication system which has mainly burst errors.

A prior ARQ system in data communication system which has a feedback channel is a selective repeat (SR) system.

FIG. 5 shows the operational time chart of an ideal SR system, in which it is assumed that a receiver has ideally infinite amount of buffer memories. In FIG. 5, symbol $S_i$ (i is integer) shows a frame number which is assigned to each data frame in a transmitter side, and $R_i$ shows a frame number which is returned from a receiver side to a transmitter side through a feedback channel. A transmitter side, upon receipt of a frame number $R_i$, recognizes that a receiver side receives correctly a frame $R_{i-1}$, and a receiver side requests a transmitter side to send a next frame $S_i$. It is assumed in FIG. 5 for the sake of simplicity of explanation that no error occurs in a feedback channel. In FIG. 5, the symbol 0 shows that a frame is received correctly, and the symbol X shows a frame is not received correctly.

The SR ARQ system has the feature that a transmitter side repeats the transmission of only a frame which is requested by a receiver side. Further, a transmitter side disregards a repeat request $R_i$ which is received by the transmitter side within round-trip-delay (RTF), since it is much possible that a correct frame which is repeated to a receiver side has not been received yet by a receiver side. The value of RTF is pre-determined in each system in a design stage of a system, considering delay time between a transmitter side and a receiver side. In the embodiment of FIG. 5, the value of RTF is time for four frames.

In FIG. 5, the receiver side (RX) receives the frame $S_0$ correctly, and therefore, returns a request frame $R_1$, requesting to send the frame $S_1$. The frame $S_1$ is also received correctly. However, the frame $S_2$ is not received correctly, and therefore, the request frame $R_2$ is returned to the transmitter side. The request frame $R_2$ is sent to the transmitter side until the frame $S_2$ is received correctly. The transmitter side recognizes $R_2$ after the frame $S_5$ is transmitted, and so, the frame $S_2$ is re-transmitted after $S_5$, and the frames $S_6$, $S_7$ and $S_8$ follow. Although the transmitter side receives the request frame $R_2$ at the timing of $S_6$ and $S_7$ after it re-transmits $S_2$, those request frames are disregarded since it is within RTF time since $S_2$ is re-transmitted. The re-transmitted $S_2$ is received correctly. So, the receiver side requests $R_5$ since $S_5$ is not received correctly, and so, the transmitter side re-transmits the frame $S_5$ after the frame $S_8$.

The SR ARQ system has disadvantage that each of a transmitter side and a receiver side must install infinite amount of buffer memory, and infinite numbers for data frames, in order to assure the correct sequence of receive frames in a receiver side, since a frame must be stored in a transmitter side and a receiver side until correct reception of each frame is acknowledged in a transmitter side, although the SR ARQ system has advantage that the transmission efficiency is excellent.

However, in an actual transmitter and an actual receiver, amount of buffer memory, and frames numbers is not infinite, but is finite repeating with modulus M. Therefore, it is absolutely impossible to implement an ideal ARQ system shown in FIG. 5.

FIG. 6 shows the operational time chart of another prior SR system, in which the modulus is 8, in which $S_i$ and $R_i$ show number of a frame in a transmitter side and a receiver side in a first modulo turn, respectively, and $S_i+$ and $R_i+$ show number of a frame in a transmitter side and a receiver side in a succeeding modulo turn, respectively. It is noted in FIG. 6 that a frame number (i of $S_i$, $R_i$, $S_i+$, $R_i+$) is one of 0 through 7, because a value of modulus is 8.

Theoretically speaking, the maximum frames which are allowed to a transmitter side to send with no acknowledge from a receiver side in an SR ARQ system is (modulus—1) frames, on the condition that the sequence of frames in a receiver side is kept. That number (modulus—1) is called a maximum outstanding number. When the modulus is 8, the maximum outstanding number is 7.

It should be noted that a receiver side can not differentiate a frame $S_i$ and a frame $S_i+$ in a receiver side since those frames have the same frame number (i) as each other, although they are differentiated in the figure for the sake of easy explanation. If a transmitter side sends frames more than the outstanding number, a receiver side can not identify from two frames which have the same frame number as each other, which modulo turn each of the frames belongs, and therefore, the sequence of the frames in a receiver side is not kept.

In wired data communication systems, the number of modulo is designed to be large enough in a system design so that no frame having the frame number close to the outstanding number is transmitted, considering transmission quality. On the other hand, in radio communication systems, in particular, in a mobile communication system, it is impossible to have large modulo, if we consider an intermittent breakdown of a hand over, and power consumption allowable for a portable terminal set.

One solution for the above problem is the combination of an SR ARQ system and a GBN (Go-back-N) ARQ system which has less transmission efficiency than an SR ARQ system but has no problem of differentiation of modulo turns.

FIG. 7 shows the operational time chart of a prior system which is the combination of an SR ARQ system, and a GBN ARQ system. The prior GBN system has the feature that a transmitter side re-transmits all the frames between the first frame that a receiver side request the re-transmission and the latest frame which the transmitter side has sent. In FIG. 7, a transmitter side has transmitted the frame $S_0+$ at time A, where the acknowledgement of $S_1$ is acknowleged by the reception of $R_2$, but no acknowledgement of $S_4$ is acknowledged, since the feedback channel for $R_5$ was in error. The number of frames which can be transmitted at time A is $(2+6)_{modulo\ 8}=0$. This means that no further frame must not be sent since 6 frames ($S_3$, $S_4$, $S_5$, $S_6$, $S_7$, $S_0+$) have been sent after $S_2$ which is the oldest frame that is not acknowledged. Therefore, the transmitter system is switched to the GBN ARQ system from the SR ARQ system, since if the transmitter side sends more frames, it exceeds outstanding number (=7). Next, during the transmission operation under the GBN ARQ system, the number of frames which can be transmitted at time B is $(5+6)_{modulo\ 8}=3$, where the frame $S_5$ is the oldest frame which is not acknowledged, and since that number (=3) is equal to or larger than 1, the transmission system is switched to the SR ARQ system, which is more efficient than the GBN ARQ system.

The prior system for the operation of FIG. 7 has the disadvantage that a frame structure must include at least one bit for indicating a flag which one of an SR system and a GBN system is used currently, and the presence of that flag decreases the transmission efficiency, and the system design of a communication system for adding that flag in a current communication system is complicated.

By the way, if we wish to operate only an SR ARQ system with no switching to a GBN ARQ system, a receiver side must differentiate two frames which have the same frame number as each other and appear for each modulo turn, for at least two modulo turns.

So, the other prior art is to have a modulo identifier in a frame structure so that which modulo a frame belongs.

FIG. 8 shows two examples of prior arts, which have a SR/GBN flag or a modulo identifier in a frame structure. In the figure, the numeral A is an area showing amount of words of a user data in the frame, B is an area containing a user data for communication, C is a frame number filled in a transmitter side, repeating the modulo M, D shows a frame number which a receiver side requests the transmission, E is a test bit (for instance a CRC bit) which is filled in a transmitter side so that a transmission error is detected in a receiver side. The symbol F is a flag showing the current operation system which is one of an SR ARQ system, and a GBN ARQ system, used in the embodiment of FIG. 7, and the symbol G is a modulo identifier showing which modulo from a frame belongs. The area D for showing a request frame is included in the frame structure, as it is assumed that the feedback channel uses the same frame structure as the forward frame structure.

FIG. 9 shows a block diagram of a prior ARQ system which has a modulo identifier of FIG. 8B, including both a transmitter side and a receiver side. In the figure, in a receiver side, a received signal is applied to an error detector 40, which tests if a transmission error occurs by checking an error detecting code in the area E which is filled in a transmitter side. When no transmission error is detected, the received signal is applied to a frame analysis circuit 42, and when a transmission error is detected, the received signal is disregarded. The frame analysis circuit 42 takes a frame number of the received frame, and sends said number to the transmit frame decision circuit 52. At the same time, the frame analysis circuit 42 forwards the whole received frame to the modulo identifier detector 44, which takes the frame number C and the modulo identifier G in the frame structure, and decides whether the current frame which is now received is a newly received frame or a re-transmission frame which has been received before. When it is a re-transmission frame, it is disregarded, and when it is a newly received frame, it is applied to a receiver data buffer 46, and simultaneously, the modulo identifier detector 44 sends the frame number which is acknowledged the safe receipt to the request frame decision circuit 54 and the receive data extract control circuit 48.

As it is an SR ARQ system in FIG. 9, no sequence of received frames is guaranteed in a receiver side. Therefore, the received data extract control circuit 48 controls the transfer of data from the data buffer 46 to the output interface buffer 50 so that the sequence of receive data is kept.

The transmit frame decision circuit 52 decides a next frame which is to be sent based upon the requested frame number D, and instructs the transmit data buffer 62 the next frame to be sent. Simultaneously, the circuit 52 instructs the transmit data produce control circuit 56 the frame number which is to be updated by a new data frame. The request frame decision circuit 54 decides the request frame based upon the frame number C of the received frame from the receiver side, and instructs the request number assign circuit 64 the request frame. The transmit data produce control circuit 56 instructs the modulo identifier assign circuit 60 the frame numbers which carry new data frames. The modulo identifier assign circuit 60 assigns the modulo identifier to the output data of the input interface buffer 58 so that a frame is recognized which modulo it belongs, and the modulo identifier together with the user data are stored in the transmit data buffer 62. The transmit data buffer 62 sends the request number assign circuit 64 a data frame based upon the instruction by the transmit frame decision circuit 52.

The request number assign circuit 64 assigns the value which is sent from the request frame decision circuit 54 into the request frame number area D in the frame structure, and sends the frame to the error detection code assign circuit 66. The error detection code assign circuit 66 fills an error detection code (for instance, a parity bit, or a CRC (cyclic redundancy check) code), and the whole frame is forwarded to a communication line.

However, a prior ARQ system, the combination of an SR ARQ system and a GBN ARQ system, and/or an SR ARQ system having a modulo identifier have the disadvantages as follows.

In case of combination of an SR ARQ system and a GBN ARQ system, it switches often to a GBN ARQ system when many burst errors occur because of deep fading in mobile communication system, and that switching would cause the undesirable decrease of throughput. Further, as a flag for indicating whether it is an SR ARQ system, or a GBN ARQ system must be included in a frame structure, the amount of data area available to a user is decreased. Further, since two systems, an SR ARQ system and a GBN ARQ system are operated, the structure of an apparatus is complicated.

FIG. 10 shows the operational time chart of a prior ARQ system, in which FIG. 10A shows the time chart in case of the combination of an SR ARQ system and a GBN ARQ system, and FIG. 10B shows the case of the modulo identifier type.

It is assumed that the modulus is 8 both in FIG. 10A and FIG. 10B.

In comparing FIG. 10A with FIG. 10B, a receiver in FIG. 10A acknowledges the correct receipt of the frame 5 at time B (frame 6 is requested by $R_6$) because of the switching to a GBN ARQ system due to continuous errors, while in FIG. 10B a receiver acknowledges the correct receipt of the frame 0+ at time B. Therefore, it appears that the modulo identifier type of FIG. 10B is better than the case of FIG. 10A.

However, the modulo identifier type of FIG. 10B has the disadvantage that it must have an identifier for indicating a modulo turn in a frame structure, and the presence of said identifier decreases a throughput. Further, as a control in a hardware is carried out for a byte which has 8 bits, the presence of a modulo identifier occupies at least 8 bits, although an identifier itself has only one bit.

SUMMARY OF THE INVENTION

The object of the present invention is to provide a new and improved ARQ system by overcoming the disadvantages and limitations of a prior ARQ system.

It is also an object of the present invention to provide an ARQ system which operates under an SR ARQ system with no switching to a GBN ARQ system.

It is also an object of the present invention to provide an ARQ system which operates under an SR ARQ system with infinite number of frames, no modulo identifier, while keeping the sequence of receive frames.

The above and other objects are attained by system for re-transmission through a Selective Repeat system in a data communication for a data frame having a forward channel and a feedback channel, having a transmitter side and a receiver side comprising; said data frame comprises at least; a first area (B) for carrying a user data, a second area (C) for carrying a frame number of each frame, said frame number being incremented one by one for each frame with a predetermined modulus M, a third area (D) for carrying a repeat request number which is forwarded from a receiver side to a transmitter side requesting transmission of a frame, and a fourth area (E) for carrying an error detection code for a frame, a fifth area (A) for carrying a number which shows how much user data is filled in said first area (B), said transmitter side comprises at least; a transmit buffer memory (62) storing said first area (B), said fifth area (A) and said second area (C) of said frame by at least a modulo turn number of frames, frame assemble means (70) for assembling a frame with a user data and modifying a part ($B_n$) in said first area (B) so that said part ($B_n$) differs from the corresponding part in a frame having the same frame number as that of a current frame in a preceding modulo turn and storing assembled frame in said memory (62), means (52) for deciding a frame for transmission according to a request number in the area (D) of a request frame from a receiver side, where a request frame within a predetermined round trip delay time is disregarded, means (66) for filling said fourth area (E) with an error detection code, and transmitting an assembled frame to a receiver side, a receiver side comprises; means (40) for detecting a transmission error in a frame by using an error code in said fourth area (E), a receive buffer memory (46) storing receive frames by at least a modulo turn of frames, means (54) for deciding a request frame to a transmit side with a request frame number (D) which is next frame of the latest received frame defined in the area (C) in case of no transmission error, or a frame which an error is detected, means (64) for filling said area (D) with a request frame number according to the decision by said means (54), and transmitting a request frame to a transmitter side, and means (66) for transmitting an output of said means (64) to said comparison means (68) for comparing said part ($B_n$) in a first area (B) in a current received frame with corresponding part ($B_n$) in corresponding frame having same frame number as that of said current received frame in a preceding modulo turn stored in said receive buffer memory (46), and deciding whether to disregard said current received frame when former coincides with latter since said current received frame has previously been received, or to take said current received frame and update content of said receive buffer memory (46) with said current received frame when former differs from latter since said current received frame is a newly received frame.

BRIEF DESCRIPTION OF THE DRAWINGS

The foregoing and other objects, features, and attendant advantages of the present invention will be appreciated as the same become better understood by means of the following description and accomanying drawings wherein;

FIG. 3 shows an operational flow chart in a receiver side, according to the present invention, FIG. 4(A) and 4(B) show a block diagram of a re-transmission system in data communication according to the present invention.

DESCRIPTION OF THE PREFERRED EMBODIMENTS

The basic idea of the present invention is an improvement of an SR ARQ system with infinite modulo number, but with no modulo identifier. The function of a modulo identifier is provided by modifying a user data itself.

Figure 1:
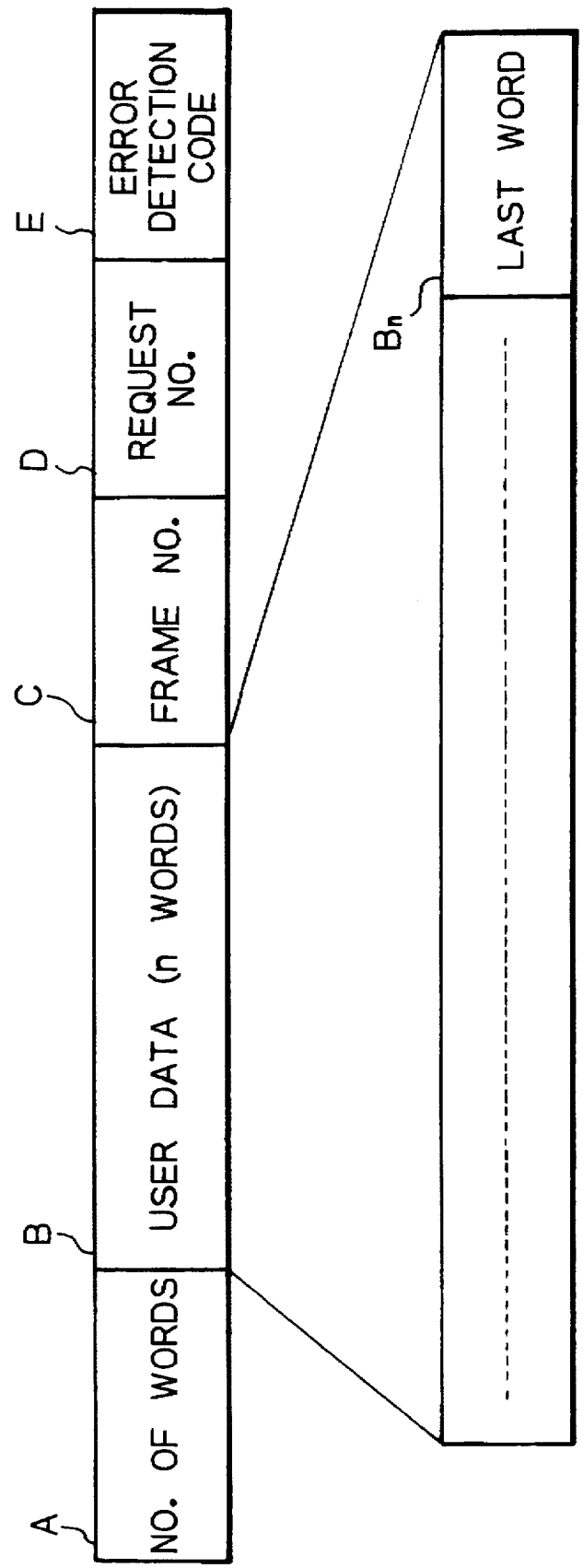
FIG. 1 is structure of a data frame according to the present invention.

FIG. 1 shows a structure of a data frame according to the present invention. The structure of FIG. 1 is essentially the same as the structure of a prior SR ARQ system. In the figure, the symbol A is an area carrying a value how many words a user data area B carry, B is a user data area for carrying a user data to be communicated. The user data area B has capacity to keep n words of data (n is integer larger than 2), and the last word $B_n$ in the data area B is used for special purpose in the present invention. The symbol C is a frame number area showing a frame number of a frame. The frame number repeats with the modulo M, so that the frame number is between 0 and M−1. The frame number is attached in a transmitter side. The symbol D is a request frame area, which is attached in a receiver side. When a transmission error is detected, it is a repeat request, and when no error is detected, it is a request of a next frame. When a transmitter side receives a request frame from a receiver side, and the content of the request frame area D is, for instance p, (p is in the range between 0 and M−1), the transmitter side recognizes that the frames up to p−1 have been received correctly, and the receiver side requests the frame of the frame number p. A receiver side may request a frame p either when the frames up to p−1 are received correctly, and requests a next frame p, or when there is a transmission error in a frame p. The symbol E is an error detection area for carrying an error detection code to detect a transmission error of a frame. The error detection code is for instance a parity bit, or a CRC code. It is assumed in FIG. 1 that the same frame structure is used in a feedback channel from a receiver side to a transmitter side.

Figure 2:
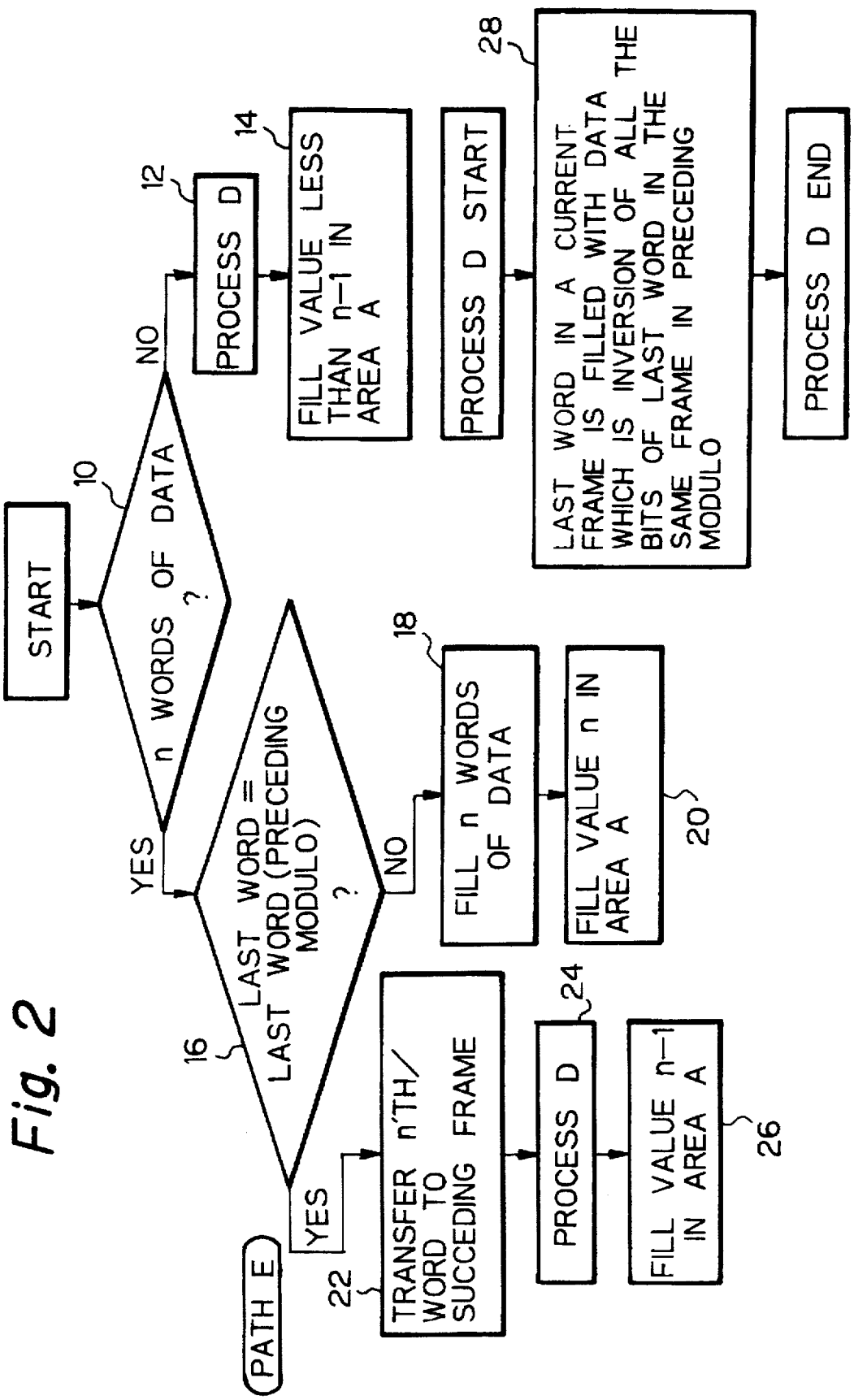
FIG. 2 shows an operational flow chart for assembling a data frame in a transmitter side, according to the present invention.

FIG. 2 shows an operational flow chart for deciding the last word $B_n$ in the user data area B in the frame structure in assembling a frame in a transmitter side. The last word $B_n$ is used to find a modulo turn of a frame in the present invention.

In FIG. 2, when the operation starts, the box 10 decides whether the user data for transmission has n words or not, where the value n is the maximum words included in an user data area B in each frame.

When the user words to be sent in a current frame are less than n, it goes to the box 12, which carries out the box 28. The box 28 fills the last word area $B_n$ of the user data area B in a current frame with a data which is an inversion of all the bits of the last words $B_n$ in a user data area B of a frame of the same frame number as said current frame in the preceding modulo turn. The box 14 fills the area A with a value which shows number of user words carried in the area B. Since the area B has capacity of n words, and the user words which should be sent are less than n words, the value in the area A is equal to or less than n−1.

When the box 10 recognizes that there are n words of user data for transmission, the box 16 tests whether all the bits in the last data word $B_n$ in the frame of the same frame number as that of the current frame in the preceding modulo are completely the same as the bits in the last data word (n'th word) in the current frame in the current modulo turn. When the former (all the bits in the last data word in the frame of the same frame number in the preceding modulo turn) are completely the same as the latter (all the bits in the last data word in the current frame in the current modulo turn), the control goes to the path E, and the box 22 transfers the last word (n'th word) to the succeeding frame, in other words, the current frame carries n−1 words and the last word (n'th word) is transmitted in the next frame. Then, the box 24 carries out the box 28 in which the last word $B_n$ in the user data area B in the current frame is filled with a data which is the inversion of the last word $B_n$ in the user data area B of a frame of the same frame number as that of the current frame, in the preceding modulo. The box 26 carries out to fill the area A with a value n−1, since n−1 user words are kept in the area B.

When the box 16 recognizes that all the bits in the last data word $B_n$ in the user data area B of the current frame are not the same as the last data word $B_n$ in the user data area B of a frame of the same frame number as that of the current frame, in the preceding modulo turn, the box 18 is carried out so that all the n data words are inserted in the user data area B. And, the box 20 fills the area A with value n.

In the above operation, it should be appreciated that the last word $B_n$ in the user data area B in the corresponding frame in a preceding modulo turn, does not completely coincide with the last word $B_n$ in the user data area B in the current frame in the current modulo turn. This feature is used in a receiver side to differentiate a frame in another modulo turn, merely by comparing the last word $B_n$ in a current frame with the last word $B_n$ in the corresponding frame which has the same frame number in a preceding modulo turn.

In FIG. 2, when the path E occurs, the last word in the user data area B is used only for differentiating modulos. However, the probability of the path E is very small, and in theoretical analysis, it is less than 0.4% provided that each word has 1 byte with bits (8 bits).

FIG. 3 shows the operational flow chart for differentiating modulo in a receiver side according to the present invention. When it starts, the box 30 reads a frame number of a frame in the area C. Then, the box 32 compares the last word $B_n$ in the user data area B of the corresponding frame in a receive buffer 46 (which stores frames in a preceding modulo), with the last word $B_n$ in the data area B in the current frame in the current modulo. When they coincide with each other, it means that the current frame is the re-transmitted frame which is already received correctly, and the current frame is disregarded.

When they do not coincide with each other, the box 34 processes the current frame as the correct frame, and the box 36 updates the content of the current frame area in the receive buffer 46 with the current received frame.

It should be appreciated that a receiver side may differentiate a modulo turn merely by comparing the last word in a user data area in a current frame with the last word in the corresponding frame which has the same frame number in a preceding modulo turn, and may determine whether a frame is re-transmitted, or it is a newly transmitted frame. Also, it should be appreciated that to keep a prior SR protocol, the buffer memory 62 and the buffer memory 46 must have the capacity enough to store a modulo number of frames (modulus number M is for instance M=8). So, it should be appreciated that the extra buffer memories are not needed for realizing the present invention.

Figure 10A:
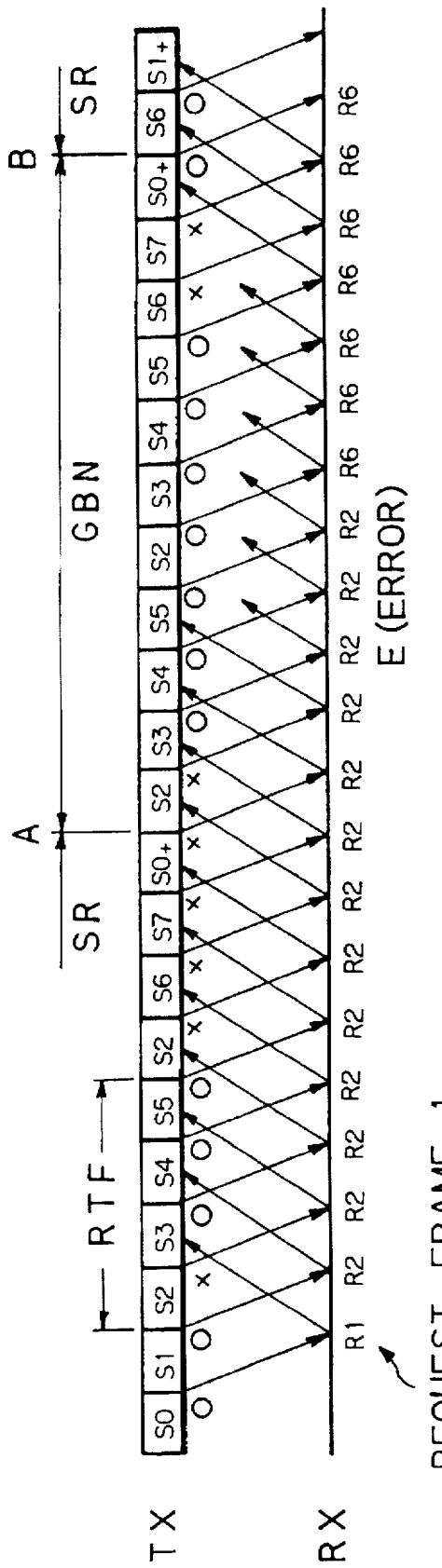
Figure 10B:
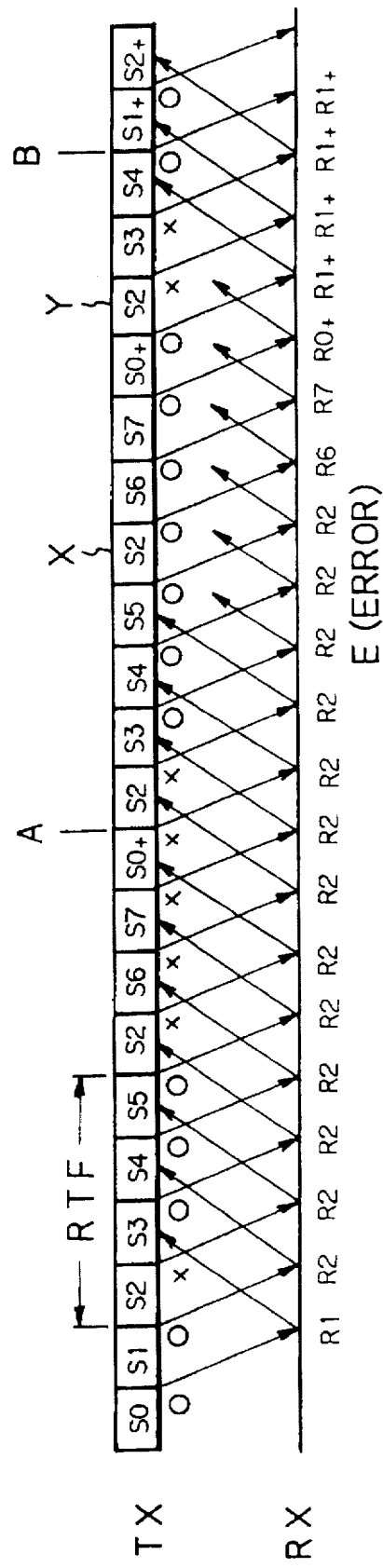

The operational time chart of the present invention is the same as that of FIG. 10B for a prior modulo identifier type.

In FIG. 10B, the transmitter side sends frames $S_0$ through $S_5$, and since $S_2$ is in error and receives a request frame $R_2$ which requests to send $S_2$, the transmitter side sends $S_2$ after $S_5$, then, sends $S_6$, $S_7$, and $S_0+$, where $S_0+$ is a frame of frame number 0 in a succeeding modulo. However, since $S_2$ is again in error, it is re-transmitted again after $S_0+$. Then, $S_3$, $S_4$ and $S_5$ are sent. Those frames $S_2$, $S_3$ and $S_4$ are sent although they have been sent correctly, since the receiver side returns a request frame R2, but does not acknowledge the safe receipt of $S_3$, $S_4$ and $S_5$. However, as $S_2$ is still in error, $S_2$ is re-transmitted again after $S_5$. And, $S_6$, $S_7$ and $S_0+$ are sent. That frame $S_2$ is received correctly with no error, and therefore, the receiver side stops to return a request frame $R_2$ which requests $S_2$ and return a request frame $R_6$ requesting $S_6$. However, since that request frame $R_6$ is not received by the transmitter side because of an error, the transmitter side does not recognize that $S_2$ is received correctly, and sends $S_2$ again after $S_0+$.

At that point, the receiver side would confuse whether the received frame $S_2$ is $S_2$ (=Y) or $S_2+$ as it has already received $S_0+$. According to the present invention, a receiver side carries out the operation in FIG. 3, and found that the last word of the current frame $S_2$ (=X) is the same as the last word of the corresponding frame (Y) stored in the memory 46, and recognizes that the current $S_2$ (=X) is a re-transmitted frame, and should be disregarded.

In the present invention, the number of user words to be able to transmit in a frame is decreased to n−1 words although a frame has capacity to transmit n words, nevertheless, the present invention is useful since the probability of the above occasion (path E in FIG. 3) is very small. In a prior art, a frame structure must have one bit for differentiating a modulo turn, or an SR system and a GBN system, and further, the presence of one bit means that it must have one word which has 8 bits.

Figure 4B:
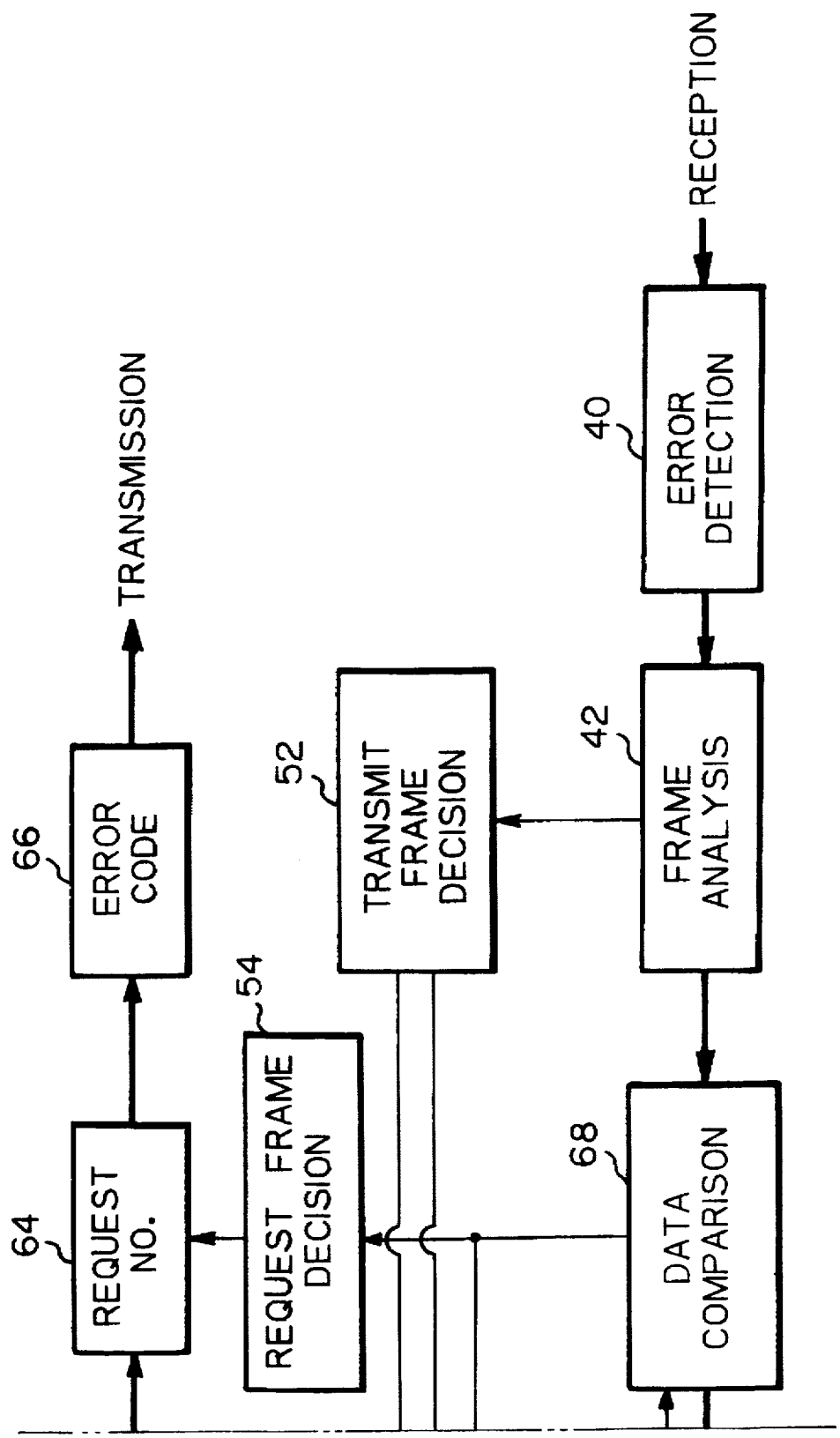
Figure 5:
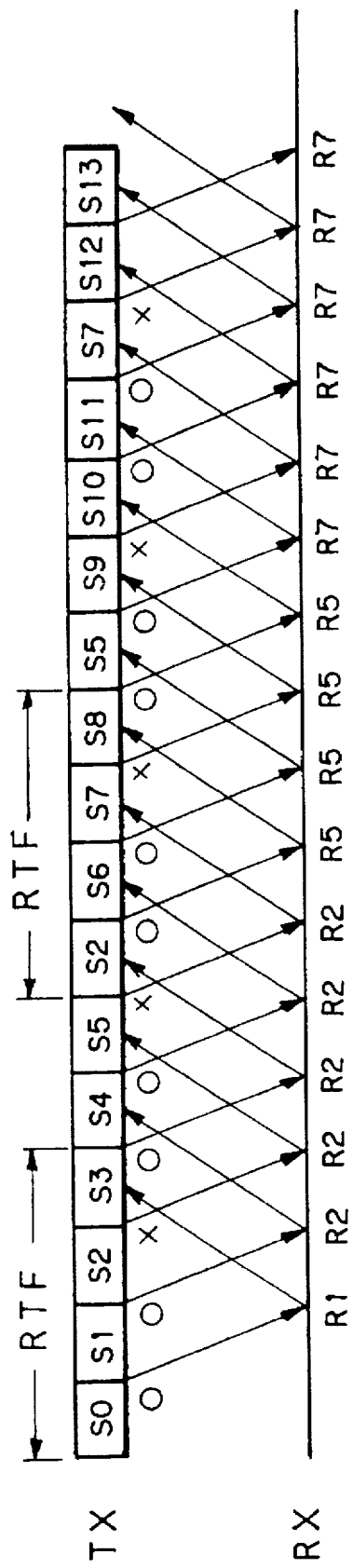
FIG. 5 shows an operational time chart of an ideal SR ARQ system.
Figure 6:
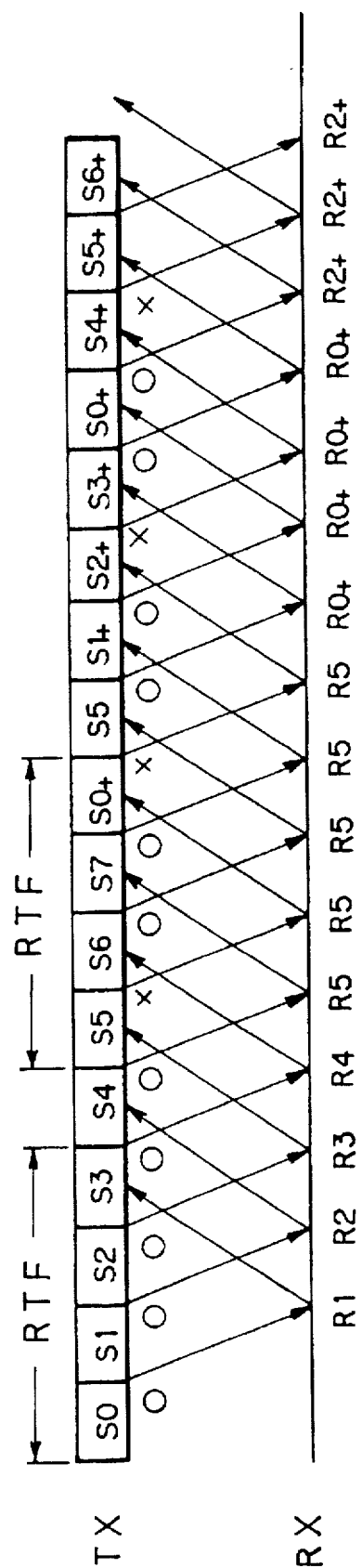
FIG. 6 shows an operational time chart in an actual SR ARQ system with the modulus number 8.
Figure 7:
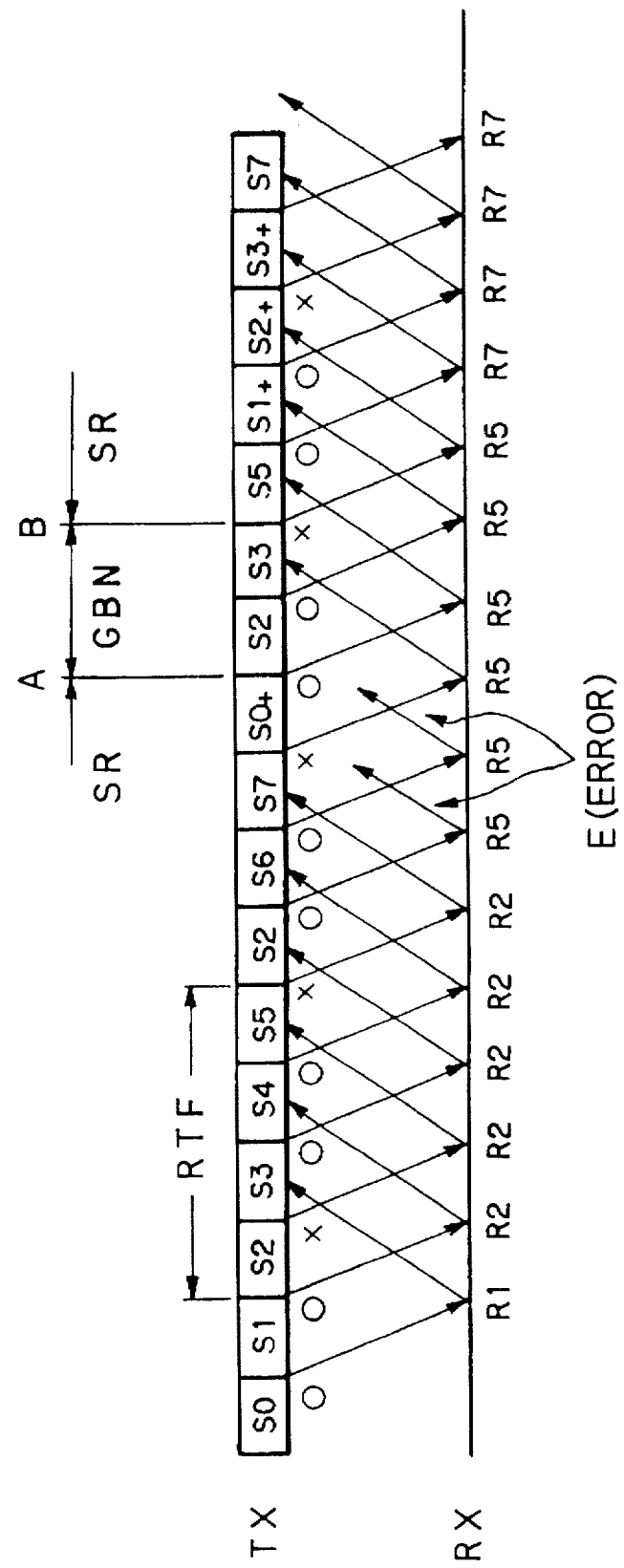
FIG. 7 shows an operational time chart in a prior art which is the combination of an SR ARQ system and a GBN ARQ system, FIG. 8 (A) and (B) show two examples of a structure of a data frame in a prior art, FIG. 9 (A) and 9 (B) are a block diagram of a prior repeat request system for data communication, and FIG. 10 (A) 10(B) shows an operational time chart in a prior art.
Figure 8A:
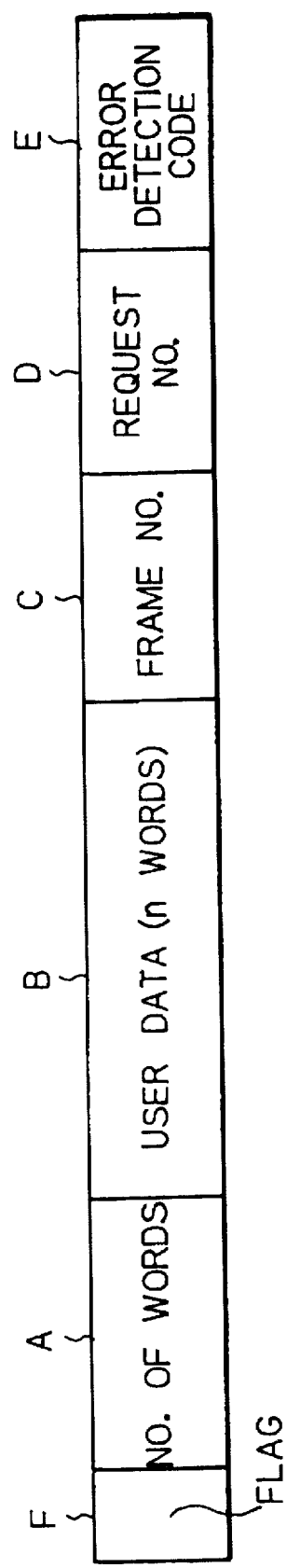
Figure 8B:
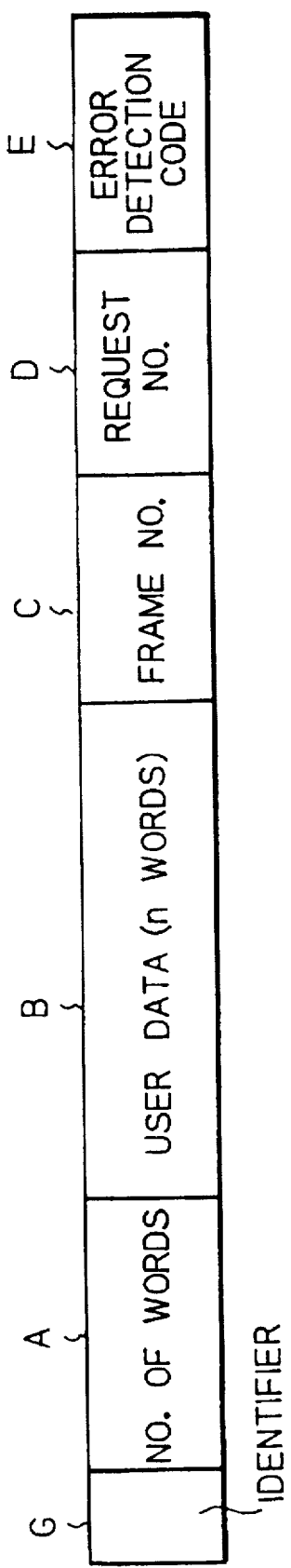
Figure 9B:
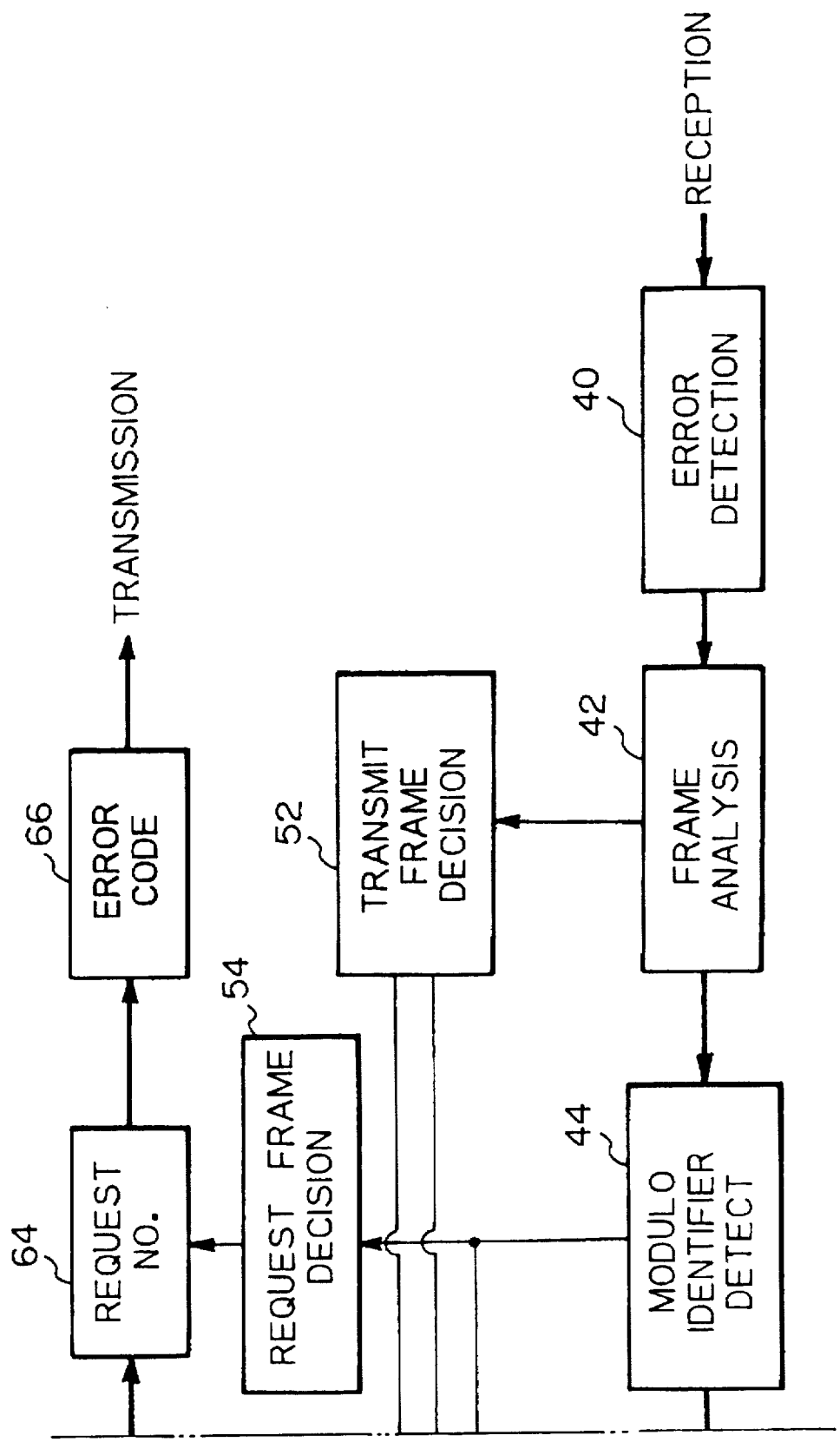

FIG. 14 shows a block diagram of the present ARQ system. The feature of FIG. 4 as compared with FIG. 9 is that a modulo identifier assign circuit 60 in FIG. 9 is replaced by a transmit frame assembling circuit 70, and that a modulo identifier detector 44 in FIG. 9 is replaced by a data comparator 68. Also, in FIG. 4, a signal line from a transmit data buffer 62 to a transmit frame assembling circuit 70, and a signal line from a receive data buffer 46 to a data comparator 68 are provided. The operation of the transmit frame assembling circuit 70 is shown in FIG. 2, and the operation of the data comparator 68 is shown in FIG. 3.

As mentioned above in detail, the present invention provides error-free transmission with high transmission efficiency in a communication circuit for a mobile communication having many burst errors, with simple structure and with no additional bit in a frame structure.

Some modification is of course possible to those skilled in the art. For instance, the last word $B_n$ for comparison is not restricted to the last word, but any portion of a user data area may be used instead of the last word.

From the foregoing it will now be apparent that a new and improved ARQ system has been found. It should be understood of course that the embodiments disclosed are merely illustrative and are not intended to limit the scope of the invention. Reference should be made to the appended claims, rather than the specification as indicating the scope of the invention.

What is claimed is:

1. System for re-transmission through a Selective Repeat system in a data communication for a data frame having a forward channel and a feedback channel, having a transmitter side and a receiver side comprising:

said data frame comprises at least;

a first area (B) for carrying user data, a second area (C) for carrying a frame number of each frame, said frame number being incremented one by one for each frame with a predetermined modulus M, a third area (D) for carrying a repeat request number which is forwarded from a receiver side to a transmitter side requesting transmission of a frame, and a fourth area (E) for carrying an error detection code for a frame, a fifth area (A) for carrying a number which shows how much user data is filled in said first area (B), said transmitter side comprises at least;

a transmit buffer memory (62) storing said first area (B), said fifth area (A) and said second area (C) of said frame by at least a modulo turn number of frames, frame assemble means (70) for assembling a frame with a user data and modifying a part ($B_n$) in said first area (B) so that said part ($B_n$) differs from the corresponding part in a frame having the same frame number as that of a current frame in a preceding modulo turn, and storing assembled frame in said transmit buffer memory (62), means (52) for deciding a frame for transmission according to a request number in the third area (D) of a request frame from a receiver side, where a request frame within a predetermined round trip delay time is disregarded, means (66) for filling said fourth area (E) with an error detection code, and transmitting an assembled frame to a receiver side, a receiver side comprises;

means (40) for detecting a transmission error in a frame by using an error code in said fourth area (E), a receiver buffer memory (46) storing receive frames by at least a modulo turn of frames, means (54) for deciding a request frame to a transmit side with a request frame number (D) which is next frame of the latest received frame defined in the second area (C) in case of no transmission error, or a frame which an error is detected, means (64) for filling said area (D) with a request frame number according to the decision by said means (54), and transmitting a request frame to a transmitter side, and means (66) for transmitting an output of said means (64) to said transmitter side with filling an error detection code to said output of said means (64), wherein the improvements comprise in that;

said receiver side comprises further comparison means (68) for comparing said part ($B_n$) in said first area (B) in a current received frame with corresponding part ($B_n$) in corresponding frame having the same frame number as that of said current received frame in a preceding modulo turn stored in said receive buffer memory (46), and deciding whether to disregard said current received frame when former coincides with latter since said current received frame has previously been received, or to take said current received frame and update content of said receive buffer memory (46) with said current received frame when former differs from latter since said current received frame is newly received frame.

2. System for re-transmission according to claim 1, wherein;

said user data has a plurality of words each of which has a plurality of bits, so that said first area has capacity of n number of words, where n is an integer larger than 2, said part of said first area is last word area in said first area, said fifth area (A) for carries a number showing how many words of a user data said first area carries, and said transmitter side comprises further means for transferring last word of a user data to a succeeding frame, filling n−1 in said fifth area, and insert in a last word area ($B_n$) of said first area (B) a data which differs at least one bit from a data in a last word area of a first area in the frame of the same frame number as that of the current frame in a preceding modulo turn, when amount of said user data is equal to or exceeds capacity of said first area, and n'th word of the current frame coincides with n'th word in the frame of the same frame number as that of the current frame in a preceding modulo turn.

3. System for re-transmission according to claim 2, wherein said word has 8 bits.

4. Method for re-transmission through a Selective Repeat system in a data communication for a data frame having a forward channel and a feedback channel, having a transmitter side and a receiver side, said data frame comprising at least;

a first area (B) for carrying a user data, a second area (C) for carrying a frame number of each frame, said frame number being incremented one by one for each frame with a predetermined modulus M, a third area (D) for carrying a repeat request number which is forwarded from a receiver side to a transmitter side requesting transmission of a frame, and a fourth area (E) for carrying an error detection code for a frame, a fifth area (A) for carrying a number which shows how much user data is filled in said first area (B), said transmitter side comprising at least the steps of; assembling said first area (B), said fifth area (A) and second second area (C) of said frame, storing assembled frame in a transmit buffer memory (62), deciding a frame to be transmitted according to content in said third area (D) of a request frame from a receiver side, and disregarding said request frame in a predetermined round-trip-delay (RTF), reading the decided frame out of said memory (62) with filling an error detection code of a frame in said fourth area (E) and transmitting the frame to a receiver side said receiver side comprising at least the steps of;

detecting a transmission error in a received frame by using an error detection code in said fourth area (E), storing said received frame in a receive data buffer memory (46) by at least a modulo turn number of frames, taking said received frame out of said memory (46) to provide a received user data, transmitting a request frame to a transmitter side with filling a request frame number in said second area (C) according to a number in said third area (D) of a received frame, wherein the improvements comprise in the steps;

said assembling step in said transmitter side further comprising the steps of modifying a part ($B_n$) in said first area (B) so that said part ($B_n$) differs from the corresponding part in a frame having the same frame number as that of a current frame in a preceding modulo turn, and said receiver side further comprising the steps of comparing said part ($B_n$) in a first area (B) in a current received frame with corresponding part ($B_n$) in a corresponding frame having the same frame number as that of said current received frame in a preceding modulo turn stored in said receive buffer memory (46), and deciding whether to disregard said current received frame when former coincides with latter since the current received frame has previously been received, or to take said current received frame and update content of said receive buffer memory (46) with said current received frame when former differs from latter since the current received frame is a newly received frame.

* * * * *